United States Patent
Kinoshita

(10) Patent No.: US 8,016,424 B2
(45) Date of Patent: Sep. 13, 2011

(54) REAR PROJECTOR AND PROJECTION SYSTEM

(75) Inventor: Satoshi Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 608 days.

(21) Appl. No.: 11/956,879

(22) Filed: Dec. 14, 2007

(65) Prior Publication Data

US 2008/0151196 A1   Jun. 26, 2008

(30) Foreign Application Priority Data

Dec. 20, 2006  (JP) ................................ 2006-342940
Dec. 7, 2007   (JP) ................................ 2007-317136

(51) Int. Cl.
*G03B 21/00* (2006.01)

(52) U.S. Cl. ............... 353/31; 353/37; 353/38; 353/85; 353/122; 349/5; 349/62; 349/64; 349/71

(58) Field of Classification Search ............. 353/31, 353/37, 38, 85, 122, 30, 119; 359/326, 327, 359/328, 329, 330, 331, 332, 599; 372/6, 372/21, 22; 349/5, 64, 62, 71; 345/32, 84, 345/156, 158, 419, 204, 157; 348/778, 779, 348/781, 787
See application file for complete search history.

(56) References Cited

U.S. PATENT DOCUMENTS

| | | | | |
|---|---|---|---|---|
| 4,401,368 A | * | 8/1983 | Drechsel et al. | 359/452 |
| 5,300,942 A | * | 4/1994 | Dolgoff | 345/32 |
| 5,349,419 A | * | 9/1994 | Taguchi et al. | 355/22 |
| 6,140,761 A | * | 10/2000 | Fushimi et al. | 313/495 |
| 6,331,878 B1 | * | 12/2001 | Takahara | 349/5 |
| 6,600,263 B1 | * | 7/2003 | Ito | 313/495 |
| 6,955,956 B2 | * | 10/2005 | Tanaka et al. | 438/166 |
| 6,986,581 B2 | * | 1/2006 | Sun et al. | 353/31 |
| 7,261,421 B2 | * | 8/2007 | Yoshikawa et al. | 353/31 |
| 7,296,897 B2 | * | 11/2007 | Mooradian et al. | 353/31 |
| 7,400,439 B2 | * | 7/2008 | Holman | 359/298 |
| 7,537,346 B2 | * | 5/2009 | Liu et al. | 353/31 |
| 7,576,908 B2 | * | 8/2009 | Shikii et al. | 359/326 |
| 7,583,431 B2 | * | 9/2009 | Furuya et al. | 359/326 |

(Continued)

FOREIGN PATENT DOCUMENTS

| | | | |
|---|---|---|---|
| JP | A 11-038512 | | 2/1999 |
| JP | 2001-100316 | * | 4/2001 |

(Continued)

*Primary Examiner* — Georgia Y Epps
*Assistant Examiner* — Sultan Chowdhury
(74) *Attorney, Agent, or Firm* — Oliff & Berridge, PLC

(57) ABSTRACT

A rear projector includes: a screen; a display light source that emits a display light; a first optical modulation element that modulates the display light emitted from the display light source; an excitation light source that emits an excitation light; a second optical modulation element that modulates the excitation light emitted from the excitation light source; and a projection unit that projects, onto the screen, the display light being a result of modulation by the first optical modulation element and the excitation light being a result of modulation by the second optical modulation element. In the rear projector, the screen includes a scattering plate configured by a chassis with a space therein and with at least one surface being light transmissive, and a scattering element filled in the space of the chassis with a light scattering material dispersed in a scattering medium, and the scatting element of the screen is irradiated with the excitation light being the result of modulation by the second optical modulation element.

16 Claims, 8 Drawing Sheets

U.S. PATENT DOCUMENTS

| | | | |
|---|---|---|---|
| 7,791,561 B2* | 9/2010 | Hajjar et al. | 345/32 |
| 2005/0002096 A1* | 1/2005 | Yonekubo et al. | 359/460 |
| 2008/0079855 A1* | 4/2008 | Komatsu et al. | 348/759 |
| 2009/0051848 A1* | 2/2009 | Minoura et al. | 349/62 |

FOREIGN PATENT DOCUMENTS

| | | |
|---|---|---|
| JP | A 2001-100316 | 4/2001 |
| JP | A 2004-520613 | 7/2004 |
| WO | WO 02/056111 A1 | 7/2002 |

* cited by examiner

REAR PROJECTOR AND PROJECTION SYSTEM

BACKGROUND

1. Technical Field

The present invention relates to a rear projector and a projection system and, more specifically, to a scintillation suppression technology for a rear projector and a projection system.

2. Related Art

In recent years, projectors have rapidly become widely available. The projectors are of two types, i.e., front projector and rear projector. The front projectors are those mainly used for presentation use, and recently the rear projectors are being acknowledged as one form of a large-screen display. The biggest advantage of a projection-type image display device is the lower price in size wise compared with a direct-view-type display such as liquid crystal television system and plasma display. However, the direct-view-type display is also recently reduced in price, and thus the image display device of projection type is required to have much higher image quality characteristics. The projector displays images by irradiating an optical modulation element such as liquid crystal light valve with lights emitted from a light source, and then by extending, for projection onto a screen, the lights being the results of modulation by the optical modulation element. At the time of such image display, a viewer not only sees images displayed on the screen but also finds the screen glaring in its entirety. This glaring is caused by varying intensity as a result of beam interference, and is called speckle noise or scintillation.

As to scintillation, the generation principle thereof is now briefly described.

As shown in FIGS. 13A and 13B, a light coming from a light source 70 passes through a liquid crystal light valve (not shown), and then is projected on a screen 74. The light projected on the screen 74 is diffracted by a plurality of scattering materials 72 included in the screen 74, and then is diffused by these scattering materials 72 behaving like a secondary wave source. As shown in FIG. 13B, two spherical waves from the secondary wave source are increased or reduced in intensity depending on the phase relationship therebetween so that light and dark fringes (interference fringes) appear between the screen 74 and a viewer. When the viewer's eyes are focused on the screen surface S where the interference fringes are observed, the viewer acknowledges the interference fringes as scintillation of glaring the projected images. The scintillation annoys the viewer who wants to look at the images on the screen as if there is a veil, a lace cloth, a spiderweb, or others between him or her and the screen surface. With scintillation occurred as such, the viewer sees double images of images on the screen and the scintillation. The viewer thus tries to focus on both of these, and resultantly gets very fatigued. As such, scintillation causes suffering to the viewer.

For use with the recent projector, a new type of light source has been under development as an alternative to the previous high-pressure mercury lamp. Especially a laser light source is highly expected to serve as a light source for use with a next-generation projector in terms of energy efficiency, color reproducibility, long life, instantaneous illumination, and others. The issue here is that lights coming from a laser light source are highly coherent on the screen with alignment of beam phase in any adjacent areas. The laser lights sometimes have the coherent length of several tens of meters, and if any one light source is divided and then combined together again, the resulting lights synthesized through an optical path being shorter than the coherent length cause strong interference. As a result, the resulting scintillation (interference fringes) is clearer than that by a high-pressure mercury lamp. In consideration thereof, reducing the scintillation is an essential technology especially in the course of making practical a projector using a laser light source.

As measures to be taken to reduce such scintillation, the following technologies have been proposed.

JP-A-11-038512 describes the technology of optimizing the diffusibility of a screen, which is of three-layer configuration including a diffusion layer, a transparent layer, i.e., lenticular lens, and another diffusion layer. With the diffusion layer complicated in configuration as such, the randomness is increased for irregular portions resulted from interference. Accordingly, with an increase of any small components in the irregular portions as a result of interference, i.e., interference fringes with low space frequency, when any movement of line of sight is observed, the interference fringes are integrated and averaged by the persistence of human vision so that there are effects that the interference fringes disappear. Especially for viewing of moving images, the line of sight moves frequently so that the reduction effects can be expected for scintillation.

JP-A-2001-100316 describes a screen of making temporal changes, i.e., shape, relative positional relationship, and index of refraction, to a light scattering element in a light scattering layer. Such changes are made by applying light, electric field, magnetic field, heat, stress, and others, to the light scattering layer. With temporal changes made as such to the scattering distribution and phase of scattering waves of the light diffusion layer, the effects can be expected for occurrence prevention of scintillation.

The problem with the technology of JP-A-11-038512 is that the scattering surface located at the end is fixed in scattering state, and this means that the distribution of beam phase is also fixed in a space between the screen and a viewer. The beam phase is the one caused by the interference between beams emitted from each point on the scattering surface. The irregular portions resulted from interference are thus acknowledged as a fixed image, and the irregular portions resulted from interference do not completely disappear unless the line of sight moves frequently. If this is the case, there are almost no effects with a projector equipped with a high-coherent laser light source. That is, no matter how much the scattering level is increased for the screen, if a viewer sees the screen with his or her eye point fixed, the viewer notices the interference fringes. Moreover, with such measures attempted to take by increasing the scattering level, there is also a possibility of causing image blurring, and thus such measures are not serving good enough to achieve the fundamental object of high image quality.

The method described in JP-A-2001-100316 is of making light scattering elements undergo the Brownian movement by varying the temperature of a light scattering layer, which is sandwiched by electrode plates each being a transparent resistance film or others. JP-A-2001-100316 also describes several other methods of making changes to the light scattering element in terms of shape and index of refraction by application of electric field, magnetic field, or others. However, such methods require a great deal of energy and time until such changes, i.e., shape, relative positional relationship, and index of refraction, are made to the light scattering element, and this is not considered efficient at all. Also with such drive means described above, the energy transmission efficiency is low with respect to the light scattering layer, and generation of vibration, noise, unwanted electromagnetic waves, exhaust heat, and others, possibly inhibits the viewing environment from being comfortable.

SUMMARY

An advantage of some aspects of the invention is to provide a rear projector and a projection system that can achieve high image quality by suppressing unevenness and glaring of display through reliable and efficient prevention of scintillation to be caused by projected lights.

A first aspect of the invention is directed to a rear projector, including: a screen; a display light source that emits a display light; a first optical modulation element that modulates the display light emitted from the display light source; an excitation light source that emits an excitation light; a second optical modulation element that modulates the excitation light emitted from the excitation light source; and a projection unit that projects, onto the screen, the display light being a result of modulation by the first optical modulation element and the excitation light being a result of modulation by the second optical modulation element. In the rear projector, the screen includes a scattering plate configured by a chassis with a space therein and with at least one surface being light transmissive, and a scattering element filled in the space of the chassis with a light scattering material dispersed in a scattering medium, and the scatting element of the screen is irradiated with the excitation light being the result of modulation by the second optical modulation element.

In the rear projector of the first aspect above, a scattering plate configuring a screen is filled with, in its chassis, a scattering element of a light scattering material being dispersed in a dispersion medium so that the light scattering material is allowed to freely move inside of the chassis. It means that when the light scattering material moves, its position is changed in the chassis with each passing time. In response to such a position change, lights being directed onto any predetermined area on the screen start varying in scattering state with the lapse of time. With the change, the interference fringes to be perceived are moved, and the pattern of the interference fringes is changed in a complicated manner. This resultantly integrates and averages the pattern of the interference fringes within the time of persistence of human vision so that the interference fringes, i.e., scintillation, are not perceived any more. As such, by the interference fringes existed between the screen and the viewer being eliminated, the feel of uneven display is also eliminated so that images of projected lights look satisfactorily better, and the viewer can be protected from fatigue to a great extent.

The inventor of the invention pays attention to the fact that when the scattering element is increased in temperature through application of heat to the screen, the molecules in the dispersion medium become active in terms of thermal agitation, and the light scarring material starts undergoing actively the Brownian movement. Accordingly, the inventor has come up with the idea of irradiating the scattering element with an excitation light for exciting the light scattering material for the Brownian movement through application of heat to the scattering element. This light irradiation is performed through the light-transmission surface of the chassis of the scattering plate. The concern here is that simply irradiating the screen with the excitation light, e.g., uniformly irradiating the entire screen with the excitation light, indeed activates the Brownian movement with the increased temperature of the entire screen, but the manner of the movement of the light scattering material over the screen cannot be controlled thereby. In consideration thereof, the inventor of the invention hit the idea that the light scattering material can be controlled, to some degree, in terms of the movement direction or others if any speed distribution is generated for the Brownian movement as a result of some temperature distribution generated to the scattering element in the screen surface through modulation of an excitation light using an optical modulation element. Herein, the excitation light is of energy of about the level enough to excite the light scattering material for the Brownian movement, and is not required to be high in energy as in the technology of previous JP-A-2001-100316.

That is, the rear projector of the first aspect of the invention is configured to include a first optical modulation element that modulates a display light emitted from a display light source, and a second optical modulation element that modulates an excitation light emitted from an excitation light source. In the rear projector, a projection unit irradiates a scattering element with the excitation light being a result of modulation. Such a configuration enables to control, by a modulation pattern, the excitation light in the screen surface in terms of being irradiated or not irradiated and the strength thereof so that a temperature distribution can be generated for the scattering element. As a result of such a temperature distribution, a speed distribution is also generated for the Brownian movement so that the light scattering material can be controlled in terms of the movement direction. Utilizing such effects, control can be so applied not to generate a static point during the movement of the light scattering material, e.g., to put the light scattering material in circular motion in the screen surface. When a static point is generated during the movement of the light scattering material, scintillation occurs at the moment. As such, by moving the light scattering material in such a manner as not to generate a static point, any possible scintillation can be prevented from occurring without fail.

In the first aspect of the invention, the excitation light is preferably of a wavelength not in a visible range.

Although the excitation light may be of a wavelength in a visible range, if with an excitation light of a wavelength not in a visible range, a viewer cannot see the excitation light. Accordingly, it becomes possible to prevent any possible scintillation by sufficiently exciting the light scattering material for the Brownian movement without posing no specific problem to projected images.

Also in the first aspect of the invention, preferably, the excitation light source is an infrared laser, and the excitation light is an infrared light.

If an infrared laser is used as the excitation light source, and if an infrared light is used as the excitation light, the scattering element is provided with the sufficient level of heat so that the light scattering material can be excited to a sufficient level for the Brownian movement. If a liquid crystal light valve is used as the optical modulation element, radiation of ultraviolet ray may possibly accelerate the degradation of the liquid crystal light valve. However, radiation of infrared ray may not accelerate the degradation of the liquid crystal light valve that much.

Also in the first aspect of the invention, the first optical modulation element preferably includes a plurality of optical modulation sub-elements each modulate the display light varying in wavelength range.

If this is the configuration, providing three optical modulation elements for respectively modulating display lights of three colors, e.g., red (R), green (G), and blue (B), enables to implement a rear projector capable of full-color image display.

Also in the first aspect of the invention, when an excitation light is of a wavelength not in a visible range, alternatively, the excitation light may be directed, together with the display light, to any one of the optical modulation sub-elements of the first optical modulation element, and the optical modulation sub-element may serve also as the second optical modulation element.

As an alternative configuration, the first optical modulation element for modulation use of display light may be provided separately from the second optical element for modulation use of excitation light. If an excitation light is directed to any one of a plurality of first optical modulation elements, and any one of such first optical modulation elements serves also as the second optical modulation element for modulation use of excitation light, the manufacturing cost can be prevented from increasing with no increase of the number of the optical modulation elements.

Also in the first aspect of the invention, when any one of a plurality of optical modulation sub-elements of the first optical modulation element serves also as the second optical modulation element, the excitation light is preferably modulated in a period when the optical modulation sub-element performs no modulation to the display light.

When any one first optical modulation element serves also as the second optical modulation element, there are advantages of not increasing the number of the optical modulation elements. However, there is a possibility that the excitation light may not be directed to the screen at all when the optical modulation element is not performing modulation. If a first optical modulation element for displaying color of red is also a second optical modulation element, and if with a long period of image formation only by first optical modulation elements for respectively displaying colors of green and blue, the screen is irradiated with no excitation light during the period. As such, by performing modulation of the excitation light separately from modulation of the display light during such a period, the light scattering material can be excited for the Brownian movement so that any possible scintillation can be suppressed from occurring.

As one possible configuration when any one first optical modulation element serves also as the second optical modulation element, on a light-incident side of the optical modulation element, an optical path combining unit may be provided for combining an optical path for the display light and an optical path for the excitation light.

This configuration only requires an optical path combining unit on the light-incident side of one first optical modulation element, and the remaining optical components can remain the same as those in the previous technology.

As another possible configuration when any one first optical modulation element serves also as the second optical modulation element, a wavelength conversion element may be provided for generating the display light of one of the various wavelength ranges by applying wavelength conversion to a part of the excitation light. In the configuration, the display light generated by the wavelength conversion element and the excitation light not subjected to wavelength conversion are to be directed to the optical modulation element.

This configuration is considered preferable for a projector that is originally difficult to obtain a visible light source of a predetermined wavelength range, and generates a visible light by subjecting any non-visible light coming from a non-visible light source to wavelength conversion by a wavelength conversion element. If this is the case, a non-visible excitation light is partially directed to the wavelength conversion element, and a display light generated by the wavelength conversion element is directed to the optical modulation element together with the excitation light not subjected to the wavelength conversion so that the first optical modulation element can easily serve also as the second optical modulation element.

A second aspect of the invention is directed to a projection system, including: a screen; and a projection engine. In the projection system, the projection engine includes: a display light source that emits a display light; a first optical modulation element that modulates the display light emitted from the display light source; an excitation light source that emits an excitation light; a second optical modulation element that modulates the excitation light emitted from the excitation light source; and a projection unit that projects, onto the screen, the display light being a result of modulation by the first optical modulation element and the excitation light being a result of modulation by the second optical modulation element. The screen includes a scattering plate configured by a chassis with a space therein and with at least one surface being light transmissive, and a scattering element filled in the space of the chassis with a light scattering material dispersed in a scattering medium, and the scatting element of the screen is irradiated with the excitation light being the result of modulation by the second optical modulation element.

Similarly to the rear projector of the first aspect of the invention, this configuration can lead to a projection system of offering a viewer high-quality images with no suffering by preventing scintillation to be caused by projected lights with reliability and efficiency, and by suppressing the degree of image glaring.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

In the below, a first embodiment of the invention is described by referring to FIGS. 1 to 9.

Figure 1:
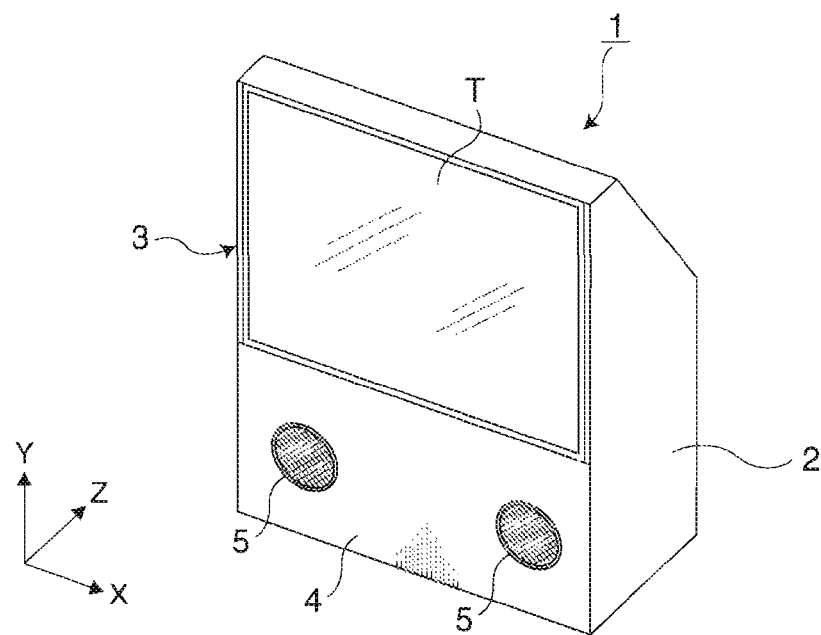
FIG. 1 is a perspective view showing the configuration of a rear projector of a first embodiment of the invention.
Figure 2:
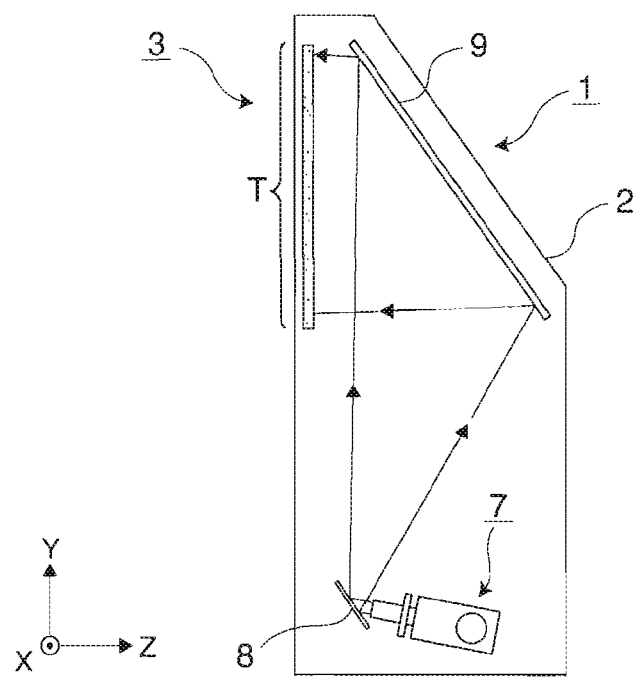
FIG. 2 is a side cross sectional view of the rear projector of the first embodiment.
Figure 3A:
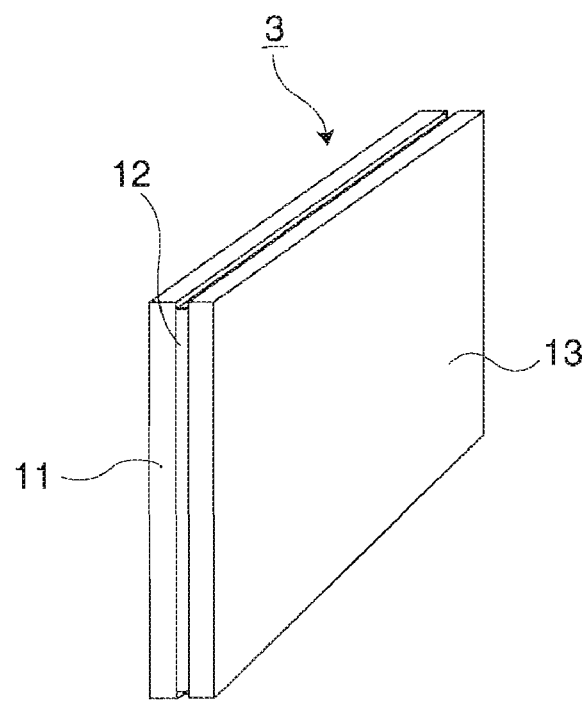
FIG. 3A is a perspective view of a screen of the rear projector of the first embodiment.
Figure 3B:
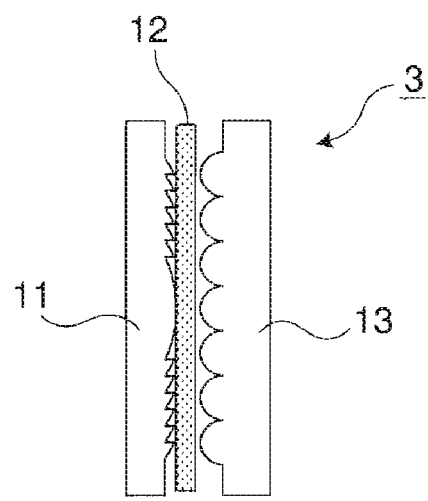
FIG. 3B is a cross sectional view thereof.
Figure 4:
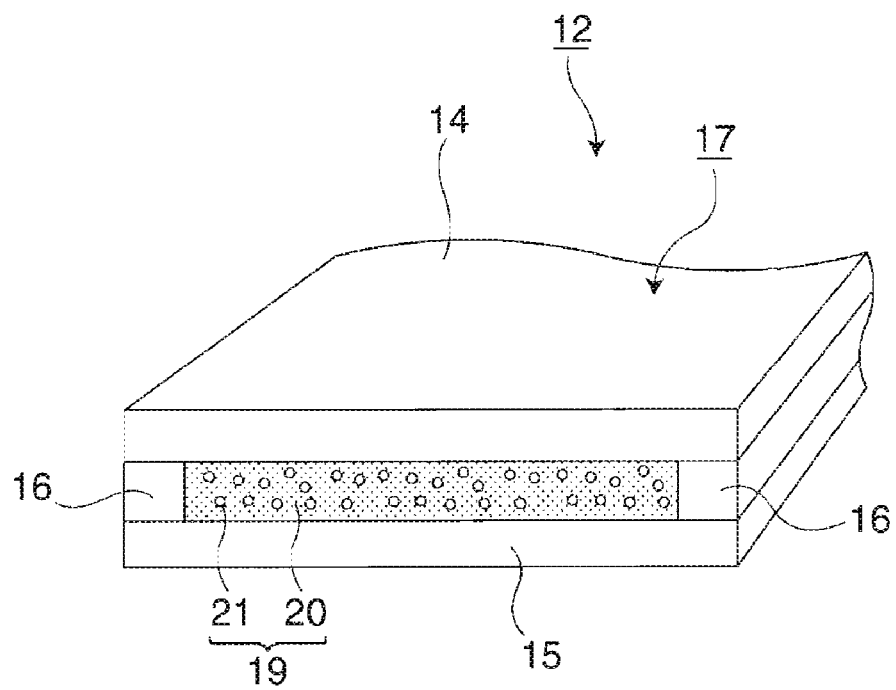
FIG. 4 is a cross sectional view of a scattering plate configuring the screen of the first embodiment.
Figure 5A:
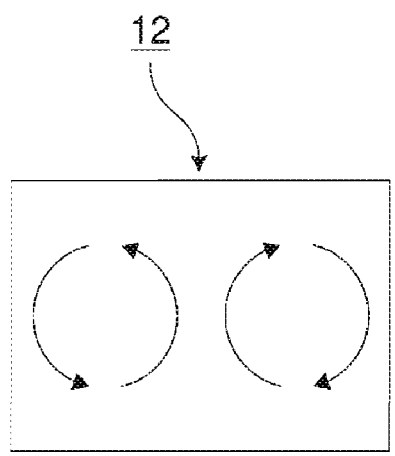
FIGS. 5A and 5B are each a diagram showing the movement of a light scattering material in the scattering plate.
Figure 5B:
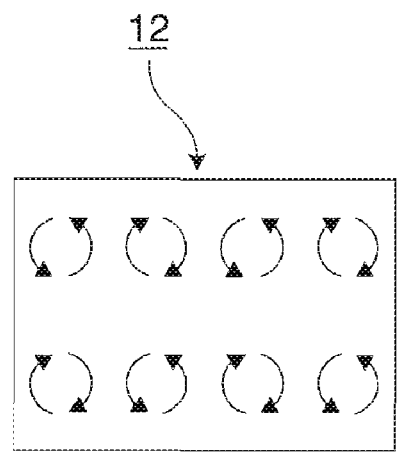
Figure 6:
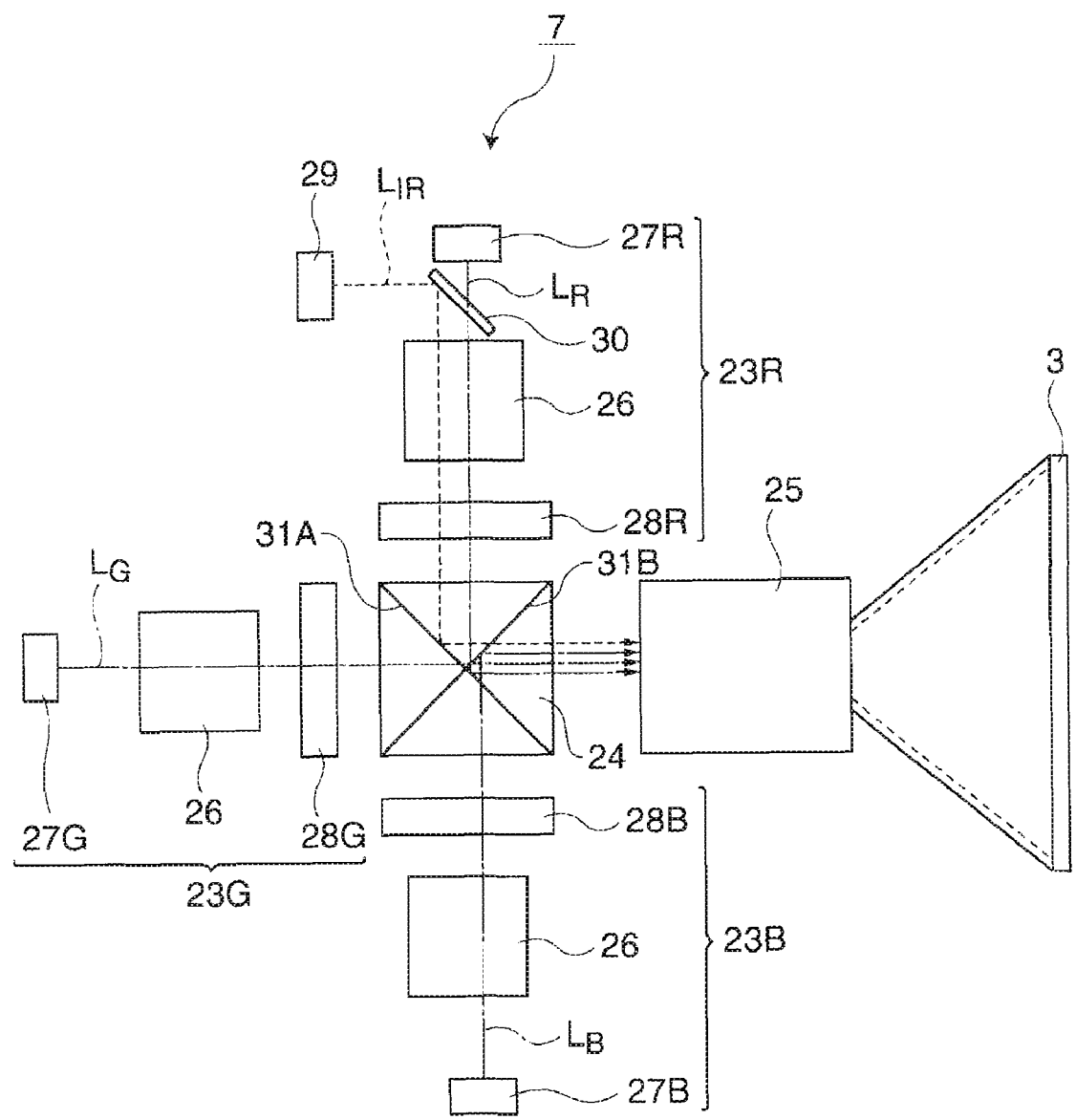
FIG. 6 is a schematic diagram showing the configuration of a projection engine in the rear projector of the first embodiment.
Figure 7:
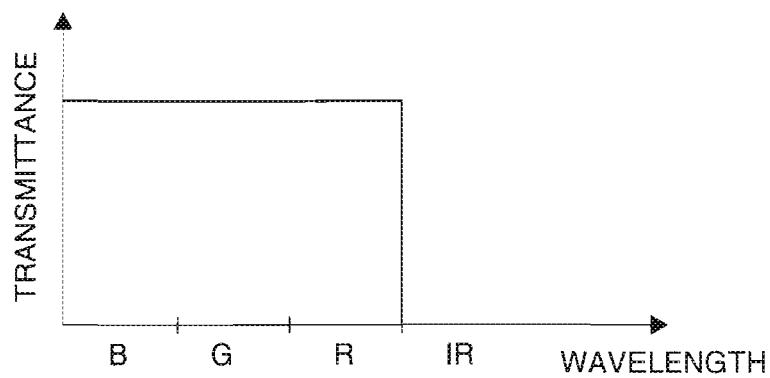
FIG. 7 is a diagram showing the transmission characteristics of a dichroic mirror in the projection engine of the first embodiment.
Figure 8:
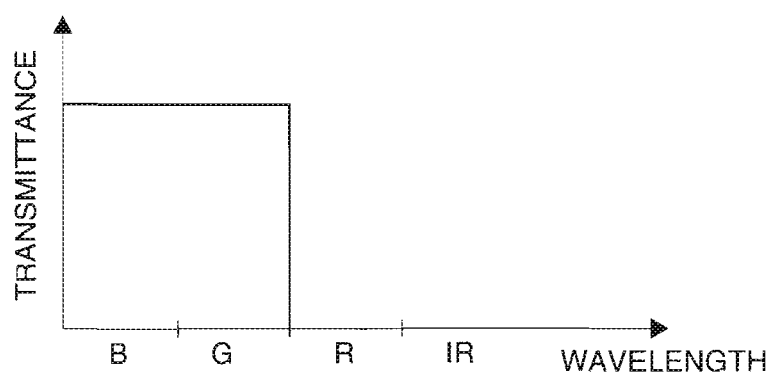
FIG. 8 is a diagram showing the transmission characteristics of a cross dichroic prism in the projection engine of the first embodiment.
Figure 9:
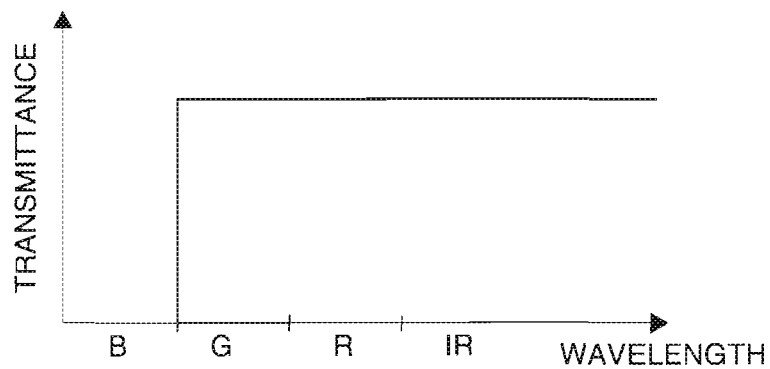
FIG. 9 is another diagram showing the transmission characteristics of the cross dichroic prism in the projection engine of the first embodiment.

FIG. 1 is a perspective schematic view showing the configuration of a rear projector of a first embodiment of the invention. FIG. 2 is a side cross sectional view of the rear projector of the first embodiment. FIGS. 3A and 3B are each a diagram showing a screen of the rear projector, i.e., FIG. 3A is a perspective view thereof, and FIG. 3B is a cross sectional view thereof. FIG. 4 is a cross sectional view of a scattering plate configuring the screen. FIG. 5 is a diagram showing the movement of a light scattering material in the scattering plate. FIG. 6 is a schematic diagram showing the configuration of a projection engine of the rear projector. FIGS. 7 to 9 are each a diagram showing the transmission characteristics of optical components, i.e., dichroic mirror and cross dichroic prism, in the projection engine.

For better view in these drawings, the components vary in film thickness and ratio of dimension as appropriate, for example.

A rear projector of this embodiment is a rear-projection-type projector that uses an optical modulation element to modulate lights coming from a light source, and extends the resulting modulated lights onto a screen for projection thereon. As such, the screen for use is of a transmissive type. As shown in FIG. 1, a rear projector 1 is configured to include a chassis 2 and a screen 3. The screen 3 is disposed on the front side of the chassis 2, and image lights are projected from the rear surface side of the screen 3 so that the resulting images become available for a viewer positioned on the front side of the screen 3. A front panel 4 is disposed below the screen 3 on the front side of the chassis 2, and aperture portions 5 are respectively disposed on right and left sides of the front panel 4 for outputting audio from a speaker (not shown).

Described next is the internal configuration of the chassis 2.

As shown in FIG. 2, inside of the chassis 2, a projection engine 7 is disposed at the lower portion. There is an optical path formed between the projection engine 7 and the screen 3, and the optical path carries thereon reflective mirrors 8 and 9. With this configuration, lights emitted from the projection engine 7 are reflected by these two reflective mirrors 8 and 9, and are extended to a projection area T on the screen 3 for projection thereon.

Described next is the configuration of the screen 3.

As shown in FIGS. 3A and 3B, the screen 3 of this embodiment is of three-layer configuration including a Fresnel lens plate 11, a scattering plate 12, and a lenticular lens plate 13, which are laminated in this order from the light-incident side. These members 11, 12, and 13 are disposed on the optical path of a projection light L in such a manner that the side of the Fresnel lens plate 11 comes on the inner side of the chassis 2, and the side of the lenticular lens plate 13 comes on the outer side of the chassis 2, i.e., the side of a viewer. The Fresnel lens plate 11 and the lenticular lens plate 13 can be those generally available. Note that, the screen 3 is not surely restrictive to be of three-layer configuration as described above, and two-layer configuration will also do, e.g., either the Fresnel lens plate 11 or the lenticular lens plate 13 is configured as a piece with the scattering plate 12. In this embodiment, exemplified is the three-layer configuration with which the scattering plate 12 can be manufactured with most ease. Alternatively, in addition to the components described above, any other components may be additionally provided, e.g., a black mask or a surface protection plate.

The scattering plate 12 serves to form images with projected lights coming from the projection engine 7, and is a so-called main scattering plate in the screen 3. As shown in FIG. 4, in the scattering plate 12, a first substrate 14 and a second substrate 15 are disposed to oppose each other with a predetermined space therebetween, and these first and second substrates 14 and 15 are attached together via a sealing material 16 at each end. These two substrates 14 and 15 configure a chassis 17 of the scattering plate 12 with a space therein. The inner space of the chassis 17 is filled with a scattering element 19 in the form of liquid. With such a transmissive screen as that in this embodiment, the first and second substrates 14 and 15 are both required to be of light transmissive. On the other hand, when the screen is of reflective type, the substrate on the light-incident side, i.e., viewer side, is required to be of light transmissive, but the remaining substrate is not required to be of light transmissive.

The scattering element 19 is colloidal fluid in which spherical light scattering particles 21, i.e., light scattering material, are uniformly dispersed in a dispersion medium 20 such as water, and the light scattering particles 21 are allowed to freely move in the dispersion medium 20. The light scattering particles 21 are preferably light-transmissive spherical particles such as inorganic material including silicon oxide, alumina, calcium carbonate, and glass, resin material including acrylic resin, and amorphous organic material including silicone resin. Among these, with consideration given to the specific gravity being relatively small, the resin particles are considered preferable. With appropriate requirements setting, i.e., specific gravity and state of surface charge of the light scattering particles 21, viscosity of the dispersion medium 20, and others, the light scattering particles 21 can be continuously dispersed with no precipitation in the dispersion medium 20. The dispersion medium 20 is surely not restrictive to water, and may be a non-electric-conductive organic solvent, and if possible, the dispersion medium 20 is desirably added with a surface active agent of assisting electrification of the light scattering particles 21. The light scattering particles 21 are also desirably subjected in advance to the surface processing to accelerate electrification. The particle diameter of the light scattering particles 21 is desirably so set as to satisfy both the light scattering effect and its own dispersion effect, e.g., about several μm to several tens of μm. In view of the object of the invention, i.e., activating the light scattering particles 21 for the Brownian movement, preferably, the light scattering particles 21 are both small in specific gravity and particle diameter, and the dispersion medium 20 is low in viscosity.

By referring to FIG. 6, described next is the schematic configuration of the projection engine 7.

Note here that, for better view of an optical path with simplified drawing, FIGS. 3A and 3B are not showing the chassis 2 and the reflective mirrors 8 and 9 in the rear projector 1, and lights emitted from the projection lens of the projection engine are directed straight for irradiation onto a screen.

The projection engine 7 is configured to include illumination/modulation optical systems 23R, 23G, and 23B for colors of red (R), green (G), and blue (B), respectively, a cross dichroic prism 24, and a projection lens 25, i.e., a projection unit. The illumination/modulation optical systems 23R, 23G, and 23B, are respectively provided with laser light sources 27R, 27G, and 27B, i.e., display light sources, and liquid crystal light valves 28R, 28G, 28B, i.e., first optical modulation element. The illumination/modulation optical systems 23R, 23G, and 23B are also each provided with an illumination optical system 26. The cross dichroic prism 24 combines lights emitted from these three illumination/modulation optical systems, and the projection lens 25 extends the lights as a result of modulation, i.e., combination, onto the screen 3 for projection thereon.

The illumination optical system 26 provided to each of the illumination/modulation optical systems 23R, 23G, and 23B carries therein optical components with increasing/shaping of beams, and others. With the function of making illuminance uniform, the illuminance distribution is made uniform for lights coming from the laser light sources 27R, 27G, and 27B, for example. With the function of size increasing/shaping of beams, light beams coming from the laser light sources 27R, 27G, and 27B are increased in size or shaped to be the size or the shape matching the liquid crystal light valves 28R, 28G, and 28B. Specifically, the optical components include a rod integrator, a fly's eye integrator, computer generated hologram (hereinafter, simply referred to as CGH), and others. Among these optical components, the CGH has both functions of making illuminance uniform and size increasing/shaping of beams, and thus has excellent functionality. The concern here is that the CGH is wavelength dependent, and thus is difficult to be used in an optical system accepting lights of various wavelength ranges. In this embodiment, for an optical system of accepting visible lights and infrared lights at the same time, a rod integrator and a fly's eye integrator are suitable better than the CGH.

In this embodiment, as the optical modulation element, used are three liquid crystal light valves, i.e., a liquid crystal light valve 28R for lights of red (serves both as first and second optical modulation elements), a liquid crystal light valve 28G for lights of green (first optical modulation element), and a liquid crystal light valve 28B for lights of blue (first optical modulation element). That is, the rear projector 1 of this embodiment is a so-called three-panel liquid crystal projector. The lights of red coming from the laser light source 27R for color of red are directed to the liquid crystal light valve 28R for lights of red after going through the illumination optical system 26. Similarly, the lights of green coming from the laser light source 27G for color of green are directed to the liquid crystal light valve 28G for lights of green after going through the illumination optical system 26, and the lights of blue coming from the laser light source 27B for color of blue are directed to the liquid crystal light valve 28B for lights of blue after going through the illumination optical system 26. In this embodiment, used for display are the liquid crystal light valves utilizing polarization, and thus when no laser light source is used, a polarization conversion optical system may be provided to the illumination optical system 26. The polarization conversion optical system serves to align the polarization state of lights coming from the light sources to those for use in the liquid crystal light valves 28R, 28G, 28B.

Among the illumination/modulation optical systems 23R, 23G, and 23B respectively provided for three colors, the illumination/modulation optical system 23R for lights of red is provided with an infrared laser light source 29, i.e., excitation light source, for emission of infrared lights, i.e., excitation lights. The laser light source 27R for lights of red and the infrared laser light source 29 for infrared lights are so disposed that their optical paths are orthogonal to each other. The optical path for lights of red coming from the laser light source 27R is denoted by an alternate long and short dashed line $L_R$, and the optical path for infrared lights coming from the infrared laser light source 29 is indicated by a broken line $L_{IR}$. For better view, these optical paths are shown with some displacement from each other. At the position where these two optical paths intersect, a dichroic mirror 30, i.e., an optical path combining unit, is disposed. The dichroic mirror 30 is so disposed that the reflective (transmissive) surface forms an angle of 45° with respect to both the optical path $L_R$ for lights of red and the optical path $L_{IR}$ for infrared lights. The dichroic mirror 30 has such transmissive characteristics as shown in FIG. 7, i.e., passes through lights of blue, green, and red, and reflects infrared lights. Note that lights of blue and green are not directed to the dichroic mirror 30, and thus the dichroic mirror 30 may have the characteristics of reflecting the lights of blue and green. With such a configuration, the optical path $L_{IR}$ for infrared lights is combined to the optical path $L_R$ for lights of red so that not only the lights of red but also the infrared lights are directed to the liquid crystal light valve 28R for lights of red. In the liquid crystal light valve 28R for lights of red, the lights of red and the infrared lights are both modulated. The following wavelength ranges are examples for lights of various colors and infrared lights, i.e., lights of blue: 380 to 495 nm, lights of green: 495 to 585 nm, lights of red: 585 to 720 nm, and infrared lights: 720 nm or higher. The wavelength range visible to human eyes is generally 380 to 780 nm, but actually there is almost no visibility with the wavelength range of 720 nm or higher.

The illumination/modulation optical system 23G for lights of green is provided with no excitation light source, and lights of green coming from the laser light source 27G for lights of green are directed to the liquid crystal light valve 28G for lights of green (first optical modulation element) by the illumination optical system 26. The optical path for the lights of green from the laser light source 27G is indicated by an alternate long and short dashed line $L_G$. The lights of green are then modulated by the liquid crystal light valve 28G for lights of green before emitted toward the cross dichroic prism 24. The illumination/modulation optical system 23B for lights of blue is similar to the lights of green, and lights of blue coming from the laser light source 27B for color of blue (optical path is indicated by an alternate long and short dashed line $L_B$) are directed to the liquid crystal light valve 28B for lights of blue (first optical modulation element) by the illumination optical system 26. The lights of blue are then modulated by the liquid crystal light valve 28B for lights of blue before emitted toward the cross dichroic prism 24.

As such, the three visible lights and infrared lights through with modulation by the liquid crystal light valves 28R, 28G, and 28B are directed to the cross dichroic prism 24. This cross dichroic prism 24 is made of four right-angle prisms attached together. On the interface formed by attaching the four right-angle prisms as such, dichroic mirrors 31A and 31B are so disposed as to be in the shape of a letter X. The dichroic mirrors 31A and 31B are each a dielectric multilayer film having each different transmissive characteristics. The dichroic mirror 31A is extending from upper left to lower right in FIG. 6, and its transmissive characteristics are shown in FIG. 8, i.e., passes through lights of blue and green but reflects lights of red and infrared lights. On the other hand, the dichroic mirror 31B is extending from upper right to lower left in FIG. 6, and its transmissive characteristics are shown in FIG. 9, i.e., reflects lights of blue but passes through lights of green and red and infrared lights. With such a configuration, every light is directed to the projection lens 25, and then is irradiated onto the screen 3. The three visible lights of blue, green, and red are combined together, and the resulting light is of a color image. The light is then projected by the projection lens 25 onto the screen 3 so that an image is increased in size and then displayed.

The infrared lights are irradiated onto the screen 3 as excitation lights. When the infrared lights are irradiated onto the screen 3, the infrared lights are converted into heat so that the scattering element 19 inside of the scattering plate 12 is increased in temperature. This temperature increase activates the thermal agitation of molecules in the dispersion medium 20. As a result, the Brownian movement of the light scattering particles 21 is also activated, and the light scattering particles 21 start actively moving in the dispersion medium 20. In this embodiment, modulation of the infrared lights by the liquid crystal light valve 28R for lights of red generates a temperature distribution of the scattering element 19 in the surface of the scattering plate 12. As a result of such a temperature distribution, a speed distribution of the Brownian movement is also generated so that control can be so applied to move the light scattering particles 21 at random or to put those in circular motion, for example.

There are two types of manner (timing) of irradiation for infrared lights, i.e., excitation lights.

One is to keep emitting infrared lights from the infrared laser light source 29 with no control thereover, and the side of the liquid crystal light valve 28R for lights of red is not specifically driven for the excitation lights. Because the infrared lights are not perceived by viewers, the projected images do not suffer thereby. As such, even if the infrared lights are modulated by the liquid crystal light valve 28R at the same time of image formation through modulation of the lights of red, and then are irradiated onto the screen 3 in the same pattern as the images of lights of red, the images do not suffer thereby. When moving images are being displayed, for example, the image pattern of lights of red vary with lapse of time so that the irradiation pattern also varies for the infrared lights. This is also applicable to a plurality of still images displayed in a slide show. This accordingly causes some change to the temperature distribution of the scattering element 19, and by extension, to the speed distribution of the Brownian movement for the light scattering particles 21 so that the light scattering particles 21 change their positions with varying speeds and directions in accordance with the irradiation pattern.

However, simply adopting such a method causes a problem if with a long period of image formation only by lights of green and blue but no light of red, for example, and the screen 3 is not irradiated not only with infrared light but also with lights of red during the period. This causes a problem that the infrared lights cannot serve the function of exciting the light scattering particles 21 for the Brownian movement. To solve such a problem, utilizing the fact that infrared lights have no influence over display, the liquid crystal light valve 28R for lights of red may perform modulation for excitation lights when no light of red is used for display.

As an alternative method, not to cause such a problem, a frame period configuring an image may be divided into two, and the liquid crystal light valve 28R for lights of red may be so driven as to direct visible lights onto the screen 3 in one of the resulting two periods, and infrared lights in the other period. That is, in the liquid crystal light valve 28R for lights of red, one frame period is partially allocated to a period of image projection by irradiation of visible lights, and the remaining is allocated to a period of exciting the Brownian movement by irradiation of infrared lights.

When such a method is adopted, no image projection is performed during a period of irradiation of infrared lights so that the irradiation pattern of infrared lights can be freely set irrespective of image formation. In view of not causing scintillation not even an instant, it is considered desirable if the light scattering particles 21 continuously move with no static point during the movement. In consideration thereof, as shown in FIGS. 5A and 5B, the light scattering particles 21 may be put in circular motion in the surface of the scattering plate 12. To put the light scattering particles 21 in circular motion as such, a circular pattern may be generated in the liquid crystal light valve 28R for lights of red during an irradiation period of infrared lights, thereby causing a concentric temperature distribution. As a result, the light scattering particles 21 start undergoing the spiral Brownian movement so that the light scattering particles 21 can be put in circular motion. Note that the secondary effects of adopting this method are intermittent image projection, and thus moving images can be improved in viewability.

As such, according to the rear projector 1 of the embodiment, infrared lights being excitation lights are modulated using the liquid crystal light valve 28R for lights of red so that the temperature distribution of the scattering element is generated in the screen surface. This accordingly generates the speed distribution of the Brownian movement of the light scattering particles 21, and allows to control the movement of the light scattering particles 21 as appropriate. Utilizing such effects, control can be so applied not to generate a static point during the movement of the light scattering particles 21, e.g., to move at random the light scattering particles 21 in the screen surface, or to put the light scattering particles 21 in circular motion. This enables to suppress scintillation with reliability without requiring a great deal of energy so that the resulting rear projector can offer images of high quality with less noise.

Also in this embodiment, the excitation light source is the infrared laser light source 29, and the excitation lights are infrared lights coming from the infrared laser light source 29. This allows to provide the scattering element 19 with sufficient level of heat, and to excite the light scattering particles 21 for the Brownian movement to a sufficient level. Moreover, even with non-visible lights, radiation of ultraviolet ray may possibly accelerate the degradation of the liquid crystal light valve. However, radiation of infrared ray may not accelerate the degradation of the liquid crystal light valve that much.

Also in this embodiment, the liquid crystal light valve 28R receiving infrared lights for modulation of display lights serves also as the liquid crystal light valve for modulating excitation lights. This configuration does not increase the number of liquid crystal light valves in its entirety, thereby favorably preventing any increase of the manufacturing cost. Described above are two irradiation methods of infrared lights, and with one of the methods of performing image display at the same time of irradiation of infrared lights, there are advantages of not requiring any specific driving by the liquid crystal light valve 28R for modulation of excitation lights. On the other hand, with the remaining method of performing image display with a time difference from irradiation of infrared lights, there are advantages of increasing the degree of freedom in modulation pattern setting for excitation lights, and easing the control of the movement of the light scattering particles 21 as desired. Further, the configuration of the embodiment requires only to insert one dichroic mirror 30 to be ready for infrared lights directed to the liquid crystal light valve 28R for lights of red, and the remaining optical components can be implemented with ease as are the same as those in the previous technology.

Second Embodiment

Figure 11:
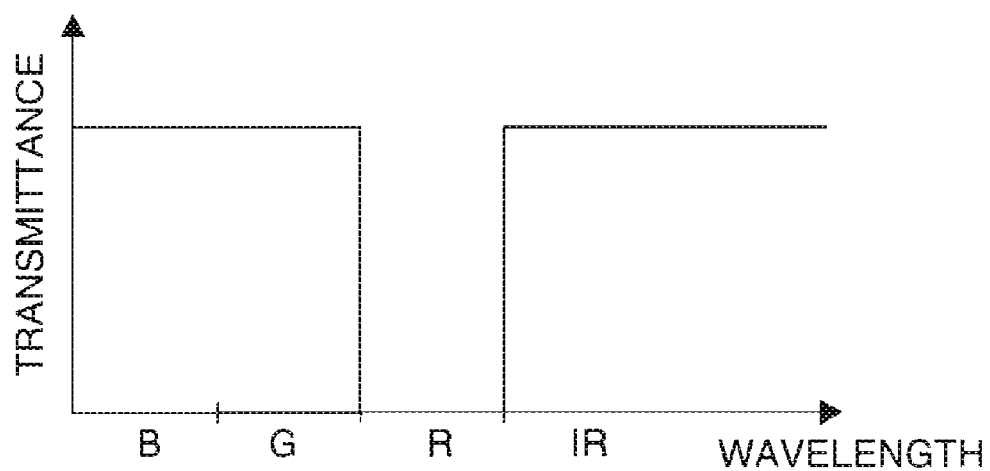
FIG. 11 is a diagram showing the transmission characteristics of a cross dichroic prism in the projection engine of the second embodiment.
Figure 12:
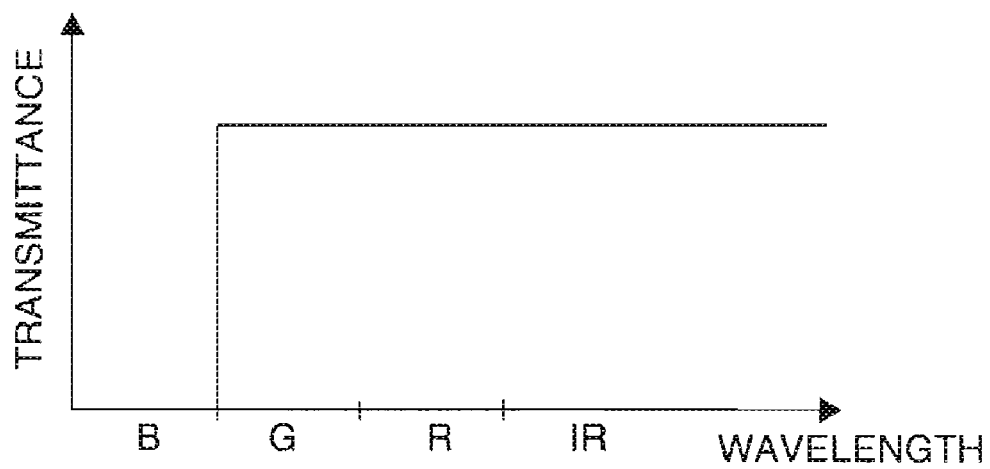
FIG. 12 is another diagram showing the transmission characteristics of the cross dichroic prism in the projection engine of the second embodiment.
Figure 13A:
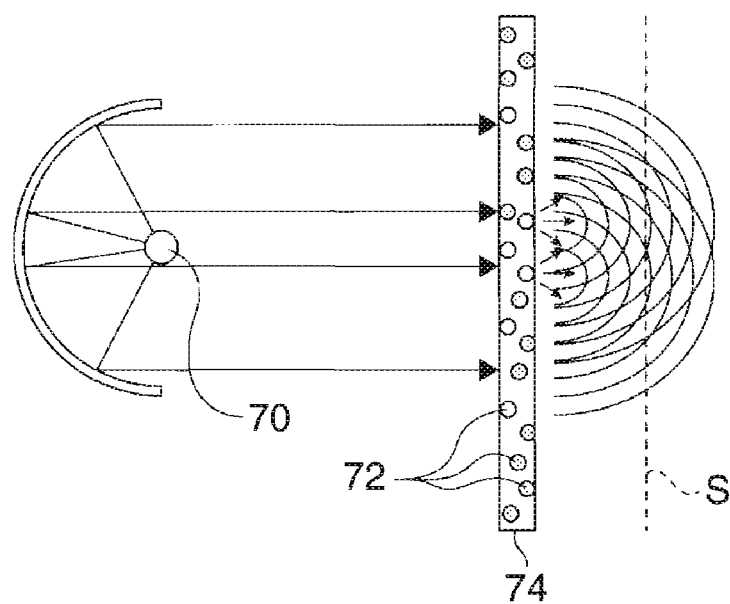
FIGS. 13A and 13B are each a diagram for illustrating the generation principle of scintillation.
Figure 13B:
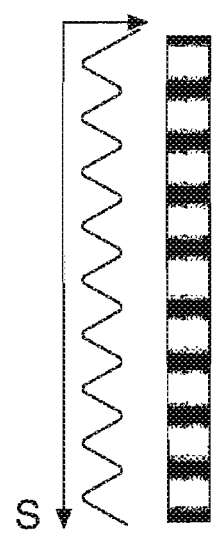

In the below, by referring to FIGS. 10 to 12, described next is a second embodiment of the invention.

The rear projector of this embodiment is similar in basic configuration to that of the first embodiment, and a difference therefrom lies in how infrared lights are directed to the optical system in the projection engine. Accordingly, any components similar to those in the first embodiment, e.g., screen, are not described twice, and described here is only the configuration of the projection engine.

Figure 10:
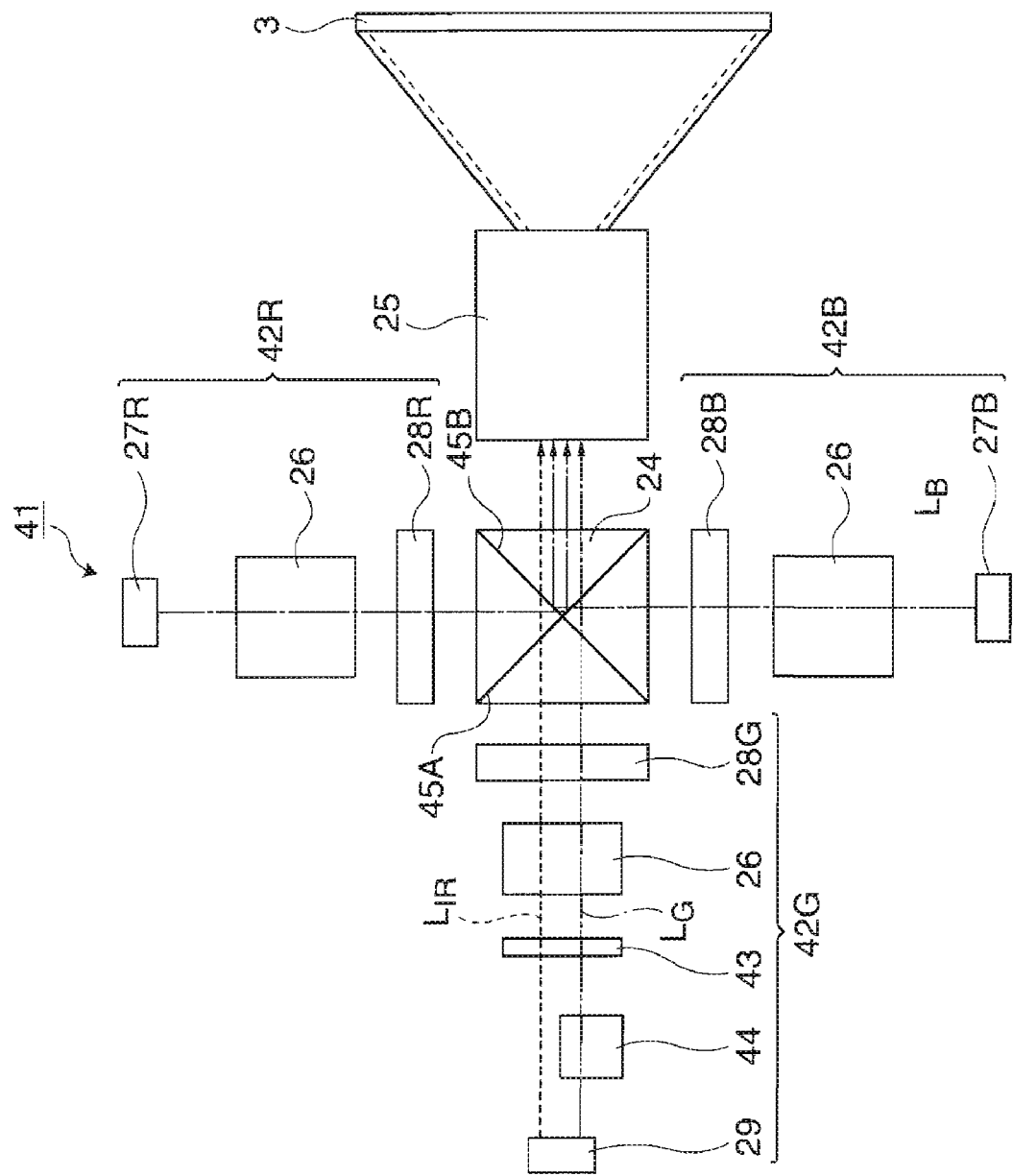
FIG. 10 is a schematic diagram showing the configuration of a projection engine in a rear projector of a second embodiment of the invention.

FIG. 10 is a schematic diagram showing the configuration of a projection engine of the rear projector of the second embodiment. FIGS. 11 and 12 are each a diagram showing the transmission characteristics of an optical component (cross dichroic prism) in the projection engine. Note that any components in FIG. 10 similar to those in FIG. 6 are provided with the same reference numerals, and not described in detail again.

The description in the first embodiment is made on the precondition that laser lights of red, green, and blue are directly emitted from laser light sources of such colors. In reality, however, it may be difficult to provide, with good balance of colors, laser light sources having sufficient level of intensity for display. In this case, the laser light source may be changed to a visible laser light source by subjecting infrared lights coming from the infrared laser light source to wavelength conversion, and generating visible lights of any arbitrary wavelength range. The configuration of the second embodiment is suitable for a projector equipped with the light source of such a type. In this embodiment, exemplified is a configuration of generating lights of green by converting the wavelength of infrared lights to ½ using secondary harmonic generation (hereinafter, simply referred to as SHG).

As shown in FIG. 10, a projection engine 41 of this embodiment is configured to include illumination/modulation optical systems 42R, 42G, and 42B for color of red (R), green (G), and blue (B), respectively, the cross dichroic prism 24, and the projection lens 25. The illumination/modulation optical systems 42R, 42G, and 42B, are respectively provided with the laser light sources 27R, 27B, and 29, the illumination optical system 26, and the liquid crystal light valves 28R, 28G, 28B, i.e., optical modulation elements. The cross dichroic prism 24 combines lights emitted from these three illumination/modulation optical systems 42R, 42G, and 42B, and the projection lens 25 extends the lights as a result of modulation, i.e., combination, onto the screen 3 for projection thereon. The illumination/modulation optical system 42B for lights of blue not receiving excitation lights may be of the same configuration as that of the first embodiment, and the illumination/modulation optical system 42R for lights of red also not receiving excitation lights may be of the same configuration as the illumination/modulation optical system 42B for lights of blue. Among these illumination/modulation optical systems, the illumination optical system 26 is similar in specific configuration as that of the first embodiment.

The excitation lights are directed to the liquid crystal light valve 28R for lights of red in the first embodiment, but the excitation lights are directed to the liquid crystal light valve 28G for lights of green in this embodiment. Accordingly, the illumination/modulation optical system 42G for lights of green is different in configuration as the illumination/modulation optical systems for other colors. Therefore, described below is the illumination/modulation optical system 42G for lights of green.

The illumination/modulation optical system 42G for lights of green is provided with the infrared laser light source 29 as a light source. This infrared laser light source 29 is of a type with the external cavity configuration, and is provided with an external cavity mirror 43 on the light-exiting side of the infrared laser light source 29. To any lights emitted from the infrared laser light source 29, laser lights oscillate between the infrared laser light source 29 and the external cavity mirror 43. The external cavity mirror 43 passes therethrough a part of the lights as a result of laser oscillation, thereby extracting laser lights.

The infrared laser light source 29 is provided with a plurality of emitters (light emission points) in the direction vertical to the optical axis of outgoing lights. The optical path of lights coming from a part of the emitters carries thereon an SHG 44. Accordingly, infrared lights coming from a part of the emitters are subjected to waveform conversion into ½ by the SHG 44, and the resulting lights of green are emitted from the external cavity mirror 43. On the other hand, the lights coming from the remaining emitters do not pass through the SHG 44, and thus keep oscillating between the infrared laser light source 29 and the external cavity mirror 43 before emitted from the external cavity mirror 43 as the infrared lights. With such a configuration, in addition to the lights of green, infrared lights are also directed to the liquid crystal light valve 28G for lights of green, i.e., first optical modulation element serving also as second optical modulation element. Thereafter, the lights of green and infrared lights are modulated by the liquid crystal light valve 28G for lights of green. Note here that the lights of green and the infrared lights are to be modulated in each different area in the liquid crystal light valve 28G for lights of green.

The three visible lights and the infrared lights through with modulation by the liquid crystal light valves 28R, 28G, and 28B are directed to the cross dichroic prism 24. In the cross dichroic prism 24, a dichroic mirror 45A extending from upper left to lower right in FIG. 10 has transmission characteristics of FIG. 11, i.e., passes through the lights of blue and green and the infrared lights, and reflects the lights of red. On the other hand, a dichroic mirror 45B extending from upper right to lower left in FIG. 10 has transmission characteristics of FIG. 12, i.e., reflects the lights of blue but passes through the lights of green and red and the infrared lights. With such a configuration, every light is directed to the projection lens 25.

The effects of the second embodiment are similar to those of the first embodiment, i.e., three visible lights generate color images, and the resulting images are projected on the screen 3, and infrared lights irradiated onto the screen 3 excite the light scattering particles 21 for the Brownian movement, and the light scattering particles 21 are allowed to move in the dispersion medium 20. Unlike the first embodiment, however, infrared lights generate lights of green, and the resulting lights of green configure images in the second embodiment. Therefore, as to the irradiation timing of the infrared lights, the modulation pattern for the infrared lights cannot be controlled separately from image display. As such, if with a period when the lights of green are not used for display, there is a possibility that the screen 3 is irradiated with no infrared light during the period. However, because infrared lights have no influence over display, the liquid crystal light valve 28G for lights of green may perform modulation for excitation lights during such a period. That is, the liquid crystal light valve 28G for lights of green may be so driven that any area therein to be exposed with the lights of green may block the lights, and any area to be exposed with the infrared lights may pass through the lights.

Alternatively, in a period when no light of green is used for display, if the infrared lights are allowed not to be irradiated onto the screen 3, the area in the liquid crystal light valve 28G for lights of green may not be divided into irradiation area for lights of green and irradiation area for infrared lights. That is, beams of the lights of green and those of the infrared lights may be increased in size by the illumination optical system 26 for irradiation onto the entire area of the liquid crystal light valve 28G for lights of green. If this is the configuration, even if there is a period when no infrared light is irradiated onto the screen 3, the entire area of the screen 3 can be irradiated with the infrared lights so that the light scattering particles 21 can be entirely activated for the Brownian movement.

Also in this embodiment, the effects similar to the first embodiment can be achieved, i.e., scintillation can be suppressed without fail by the infrared lights exciting the light scattering particles 21 for the Brownian movement so that the resulting rear projector can offer images of high quality with less noise. Also it is optimum if the configuration of this embodiment is applied to a projector that generates visible lights by subjecting infrared lights to waveform conversion using a waveform conversion element such as SHG 44. If this is the case, the projector can be implemented with ease with no need to use any specific optical components but only with some placement arrangement of optical components in the vicinity of the waveform conversion element.

While the invention has been described in detail, the foregoing description is in all aspects illustrative and not restrictive. It is understood that numerous other modifications and variations can be devised without departing from the scope of the invention. For example, in the above-described embodiments, infrared lights are directed to a liquid crystal light valve for modulation use of visible lights, and such a liquid crystal light valve serves also as a liquid crystal light valve for modulation use of excitation lights. Alternatively, the excitation lights may be modulated by a liquid crystal light valve, which is provided separately from a liquid crystal light valve for visible lights. This configuration indeed increases the number of the liquid crystal light valves but allows modulation of excitation lights irrespective of image display, and eases control over the movement of the light scattering particles to be in any desired pattern. Moreover, the configuration exemplified in the first embodiment is of combining infrared lights being excitation lights to an optical path for lights of red, and the configuration exemplified in the second embodiment is of generating lights of green through waveform conversion of infrared lights, and directing the infrared lights and the lights of green to any one liquid crystal light valve all at once. However, the combination of excitation lights with what visible lights may be determined as appropriate in accordance with the ease of creation of optical characteristics of a dichroic mirror and a cross dichroic prism. Moreover, the infrared lights are not the only option for use as excitation lights, and alternatively, visible lights may be used for the purpose. When visible lights are used as excitation lights, the excitation lights have influence over display so that the liquid crystal light valve is required to be driven with consideration given to the illumination requirements for the excitation lights. Furthermore, the laser light source is not the only option for use as a light source, and any other light sources will also do.

The specific configuration of the scattering plate exemplified in the above embodiments is not restrictive thereto, and can be changed as appropriate. As to the entire rear projector, the invention is applicable not only to an optical modulation element being a liquid crystal light valve but also an optical modulation element being a reflective optical modulation element such as DMD (Digital Micromirror Device). For example, the invention is applicable not only to a three-plate projector exemplified in the embodiments but also to a single-plate projector, i.e., time-sharing type. The invention is also applicable not only to a rear projector but also to a projection system which is configured to include a screen and a projection engine. As to the projection system, there is front type or rear type projection system, the invention is applicable not only to a screen being configured separately from a projection engine but also to a screen not being configured separately from a projection engine.

The entire disclosure of Japanese Patent Application Nos. 2006-342940 filed Dec. 20, 2006 and 2007-317136 filed Dec. 7, 2007 are expressly incorporated by reference herein.

What is claimed is:

1. A rear projector comprising:
a screen;
a display light source that emits a display light;
a first optical modulation element that modulates the display light emitted from the display light source;
an excitation light source that emits an excitation light;
a second optical modulation element that modulates the excitation light emitted from the excitation light source; and
a projection unit that projects, onto the screen, the display light being a result of modulation by the first optical modulation element and the excitation light being a result of modulation by the second optical modulation element, wherein
the screen includes a scattering plate configured by a chassis with a space therein and with at least one surface being light transmissive, and a scattering element filled in the space of the chassis with a light scattering material dispersed in a scattering medium, and
the scattering element of the screen is irradiated with the excitation light being the result of modulation by the second optical modulation element, wherein
the excitation light being the result of modulation by the second optical modulation element is irradiated as an exciting light and is of a wavelength not in a visible range, and
the excitation light causes the light scattering material to move in the scattering medium.

2. The rear projector according to claim 1, wherein the excitation light is of a wavelength not in a visible range.

3. The rear projector according to claim 2, wherein the excitation light source is an infrared laser, and the excitation light is an infrared light.

4. The rear projector according to claim 2, wherein the first optical modulation element includes a plurality of optical modulation sub-elements, wherein
each of the plurality of optical modulation sub-elements modulates the display light varying in wavelength range.

5. The rear projector according to claim 4, wherein the excitation light is directed, together with the display light, to any one of the optical modulation sub-elements of the first optical modulation element, and the optical modulation sub-element serves also as the second optical modulation element.

6. The rear projector according to claim 5, wherein in the optical modulation sub-element, the excitation light is modulated in a period when no modulation is performed to the display light.

7. The rear projector according to claim 5, wherein on a light-incident side of the optical modulation sub-element, an optical path combining unit is provided for combining an optical path for the display light and an optical path for the excitation light.

8. The rear projector according to claim 5, further comprising
a wavelength conversion element that generates the display light of one of the various wavelength ranges by applying wavelength conversion to a part of the excitation light, wherein the display light generated by the wavelength conversion element and the excitation light not subjected to wavelength conversion are to be directed to the optical modulation sub-element.

9. A projection system comprising:

a screen; and a projection engine, wherein the projection engine includes:

a display light source that emits a display light;

a first optical modulation element that modulates the display light emitted from the display light source;

an excitation light source that emits an excitation light;

a second optical modulation element that modulates the excitation light emitted from the excitation light source; and a projection unit that projects, onto the screen, the display, light being a result of modulation by the first optical modulation element and the excitation light being a result of modulation by the second optical modulation element, the screen includes a scattering plate configured by a chassis with a space therein and with at least one surface being light transmissive, and a scattering element filled in the space of the chassis with a light scattering material dispersed in a scattering medium, and the scattering element of the screen is irradiated with the excitation light being the result of modulation by the second optical modulation element, wherein the excitation light being the result of modulation by the second optical modulation element is irradiated as an exciting light and is of a wavelength not in a visible range, and the excitation light causes the light scattering material to move in the scattering medium.

10. The projection system according to claim 9, wherein the excitation light is of a wavelength not in a visible range.

11. The projection system according to claim 10, wherein the excitation light source is an infrared laser, and the excitation light is an infrared light.

12. The projection system according to claim 10, wherein the first optical modulation element includes a plurality of optical modulation sub-elements, wherein each of the plurality of optical modulation sub-elements modulates the display light varying in wavelength range.

13. The projection system according to claim 12, wherein the excitation light is directed, together with the display light, to any one of the optical modulation sub-elements of the first optical modulation element, and the optical modulation sub-element serves also as the second optical modulation element.

14. The projection system according to claim 13, wherein in the optical modulation sub-element, the excitation light is modulated in a period when no modulation is performed to the display light.

15. The projection system according to claim 13, wherein on a light-incident side of the optical modulation sub-element, an optical path combining unit is provided for combining an optical path for the display light and an optical path for the excitation light.

16. The projection system according to claim 13, further comprising a wavelength conversion element that generates the display light of one of the various wavelength ranges by applying wavelength conversion to a part of the excitation light, wherein the display light generated by the wavelength conversion element and the excitation light not subjected to wavelength conversion are to be directed to the optical modulation sub-element.

* * * * *